United States Patent [19]

Krägelin et al.

[11] Patent Number: 4,792,889
[45] Date of Patent: Dec. 20, 1988

[54] DEVICE AND METHOD FOR DETERMINING WORKPIECE CONTOURS

[75] Inventors: Birger Krägelin, Karlsruhe; Wilfried Stöhr, Neulingen; Elisabeth Opitz, Graben-Neudorf, all of Fed. Rep. of Germany

[73] Assignee: Dr. Johannes Heidenhain GmbH, Traunreut, Fed. Rep. of Germany

[21] Appl. No.: 50,533

[22] Filed: May 15, 1987

[30] Foreign Application Priority Data

May 17, 1986 [DE] Fed. Rep. of Germany ....... 3616740

[51] Int. Cl.⁴ ...................... G05B 19/18; G06F 15/46
[52] U.S. Cl. ................. 364/191; 364/474,24; 364/474.26
[58] Field of Search ............... 364/188–192, 364/474, 475, 167–171

[56] References Cited

U.S. PATENT DOCUMENTS

| 4,328,550 | 5/1982 | Weber | 364/474 |
| 4,627,003 | 12/1986 | Kishi et al. | 364/474 |
| 4,642,754 | 2/1987 | Kishi et al. | 364/474 |
| 4,646,228 | 2/1987 | Ikeda | 364/474 |
| 4,660,148 | 4/1987 | Kishi et al. | 364/474 |

OTHER PUBLICATIONS

Pioneering in Technology, Computer Verification of Machine Control Data by Lawrence O. Ward, 1980.

Primary Examiner—Jerry Smith
Assistant Examiner—Allen MacDonald
Attorney, Agent, or Firm—Willian Brinks Olds Hofer Gilson & Lione Ltd.

[57] ABSTRACT

A device for generating complete data sets for the determination of a workpiece contour. Sections of a workpiece contour are input into a data memory in the form of incomplete data sets. A computer applies a contour algorithm to link the incomplete data sets into complete data sets of the workpiece contour by combining the geometric data contained in the data sets. The complete data sets are applied to a result memory and/or to a graphic unit for display. The workpiece can then be represented on a display screen and/or the workpiece generated on a numerically controlled machine tool.

10 Claims, 15 Drawing Sheets

LAST
COMPLETE
DATA SET

LAST
COMPLETE
DATA SET

DEVICE AND METHOD FOR DETERMINING WORKPIECE CONTOURS

BACKGROUND OF THE INVENTION

The present invention relates to a device and method for determining the contour of a workpiece by combining incomplete data sets to produce a representative of the workpiece contour, wherein the incomplete data sets represent portions of the workpiece contour.

Preferably, a device such as the present invention is used in numerically controlled machine tools. In certain numerically controlled machine tools, the generated workpiece contour is represented on a display screen so that a program of machining instructions for producing the workpiece contour on the numerical machine tool can be checked for accuracy. Corrections to the program, if any, can therefore be made before the workpiece is machined by the tool.

This type of machining system requires a workpiece contour generation program. The data from which the workpiece contours are generated should be, insofar as possible, read directly from the workpiece drawing. A typical workpiece drawing consists of a sequence of juxtaposed straight lines and circular arcs linked to one another to form the contour of the workpiece. If the starting point and the end point of each straight line curve are given in the drawing together with the starting and ending points of the circular arcs, including their centers, the process of obtaining the desired workpiece contour on a numerically controlled machine tool would present no difficulties. In reality however, the geometry of the workpiece is in general not adquately provided in the drawing. The intersection points of the circular arcs with one another and with rectilinear curve parts are generally unknown.

Underlying the present invention is the insight that the great majority of components or workpieces that are produced on numerically controlled machine tools can be constructed from selected geometric forms linked with one another. The number of different contour sections that are needed to be able to define the predominant portion of a typical workpiece is relatively small. These geometric forms can generally be defined by the geometric dimensions of the contour sections.

For the worker in the field, it will be obvious that the number of contour sections and their specific properties can be altered.

If therefore one views the workpiece drawing, it becomes evident that the resulting contour of the workpiece can be described by a series or sequence of contour sections. However, complete geometric data can be taken directly from the workpiece drawing only in the rarest of cases.

It is therefore an object of the present invention to create a device with the aid of which there can be determined a complete workpiece contour from contour sections whose geometric data does not have to be complete.

SUMMARY OF THE INVENTION

The present invention is directed to a device for obtaining the contour of a workpiece where geometric data is deposited in the form of incomplete data sets representative of respective sections of the workpiece contour, the data sets being combined with one another to generate the workpiece contour.

According to a preferred embodiment of the present invention, an apparatus is provided which comprises a computer, a memory and an input device. Incomplete data sets, each containing geometric data representative of a portion of a workpiece contour, may be input into the memory. The computer processes the geometric data using a contour algorithm which combines the geometric data within each data set as well as the geometric data of adjacent data sets. The combining of the geometric data is performed in accordance with selected combination rules and supplements, where possible, the geometric data of the data sets with additional geometric data to generate complete data sets. The complete data sets may then be accessed by a graphic processor for display on a graphic display screen or for controlling the production of a workpiece on a machine tool.

One advantage of the present invention is that an operator using the workpiece drawing, which normally provides insufficient data for numerically controlled programming, may, with the device and method of the present invention, determine adequate data sets for obtaining a complete workpiece contour without the necessity of undertaking complicated considerations.

The invention itself, together with further objects and attendant advantages, will be understood by reference to the following detailed description, taken in conjunction with the accompanying drawings.

DETAILED DESCRIPTION OF THE PRESENTLY PREFERRED EMBODIMENT

Figure 1:
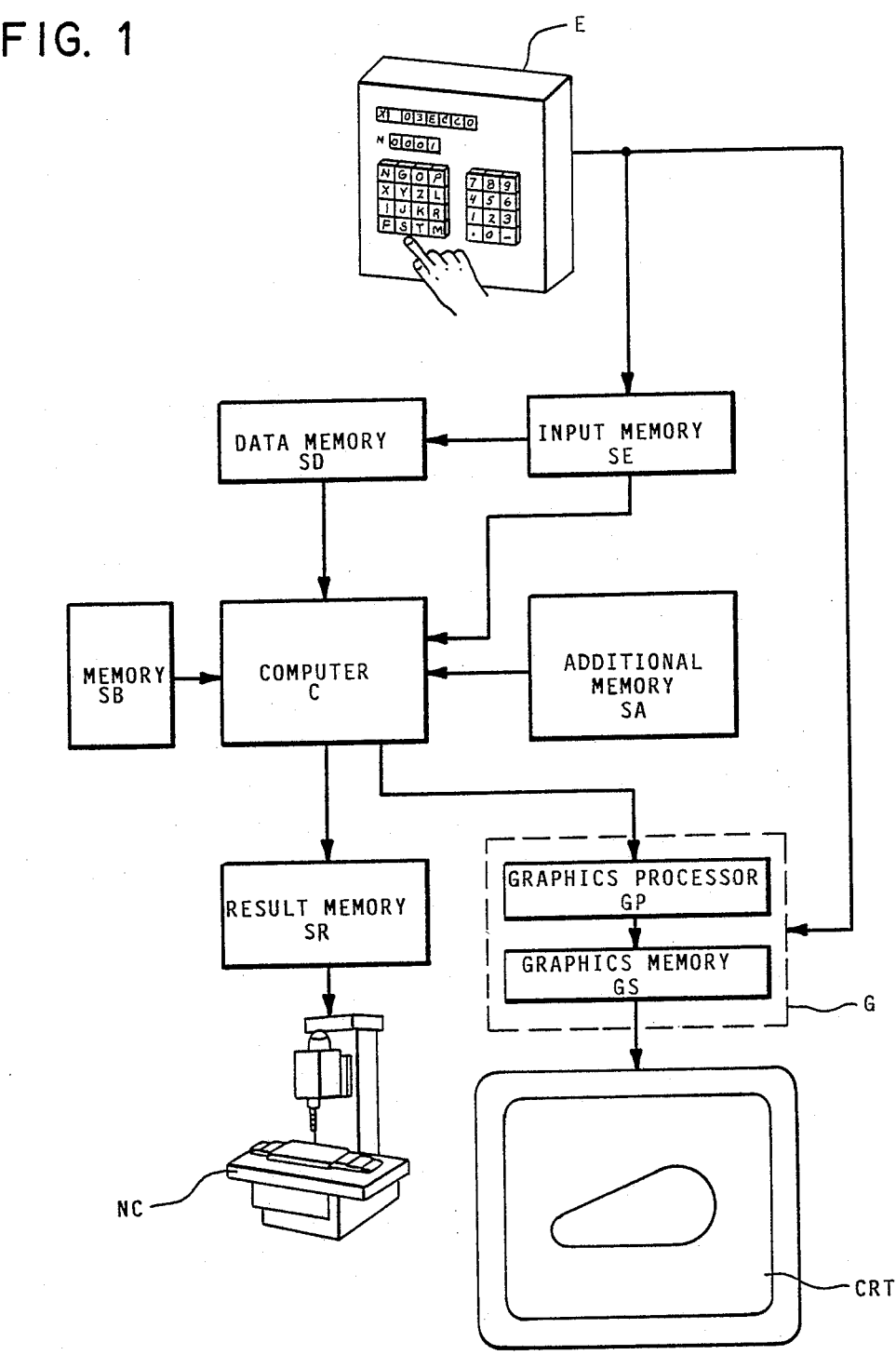
FIG. 1 shows a schematic block circuit diagram of the preferred embodiment of the present invention.

Turning now to the drawings, FIG. 1 represents a schematic block circuit diagram of the apparatus of the preferred embodiment of the present invention. The embodiment comprises an input unit E, a data memory SD, an input memory SE, and a computer C. Input data may be deposited in the input memory SE with the aid of the input unit E. The input unit E may, if desired, comprise a keyboard. From the input data, geometric data are obtained for contour sections and deposited in the data memory SD. Both the input memory SE and the data memory SD are connected to the computer C. An additional memory SA contains a contour algorithm (described in detail below) and is also connected to the computer C. A result memory SR and a graphic unit G are connected to and controlled by the computer C. The graphic unit G comprises a graphics memory GS and a graphic processor GP which drives a display unit CRT. The result memory SR contains the results of combined geometric data sets for use in numerically controlled machines. The geometric data sets and the combination of geometric data sets will be described in greater detail below.

The preferred embodiment determines the contours of a workpiece by successively combining geometric data contained in numerical control (NC) data sets. An NC data set may represent a geometric machining step and/or a specific machine function. A geometric machining step may consist of geometric instructions with which the relative movements between a numerical machine tool and a workpiece are controlled. For example, a geometric instruction may be: move tool from workpiece point A to workpiece point B. The machine function is machine dependent and may relate to the rate of tool rotation, feed rate, and the like.

The NC data set may be input into the preferred embodiment by means of the input unit E. The geometric data of the NC data set described selected contour portions of the workpiece in terms of geometrically simple elements such as circles, lines, arcs, and the like. The geometric data is inputted in the form of predefined data components U, V, IU, IV, A, IA ... listed in Appendix A. Of course, not all of the data components provided in Appendex A need be used. The specific data components used will be at least in part determined by the contour information available to the operator.

On input, each NC data set is sequentially numbered with a data set number and stored in the memory SD. The data set number may be used to reference the respective data set. The geometric data of the NC data sets are successively combined by the preferred embodiment to determine the complete contour. The combination is carried out by the computer C according to a contour algorithm stored in the memory SA.

The contour algorithm is used by the computer C to combine the geometric data according to combination rules. The combination rules are classified into three primary groups: Single Rules (Appendix B), Twofold Rules (Appendix C), and Threefold Rules (Appendix D). Each group comprises a plurality of rules which are numbered in the appendices for identification. Each rule is presented in a notation which indicates the information which is available to be used in the combination and the information that is to be obtained by means of the application of the rule. For example Rule 24 of the Single Rules is presented in Appendix A as:

<STRAIGHT, P1L, DP>→<A>

This notation indicates that for a straight line in which P1L and DP are known, the geometric component A can be determined by application of the rule. As is the case of all the rules disclosed in Appendices B, C, D, the means and manner by which the undetermined geometric component(s) is obtained from the known components are known to those skilled in the art.

The Single Rules are applied to a data set to combine the geometric data contained within the data set. The Twofold Rules are applied to a data set and one of its successor or predecessor data sets to combine the geometric data contained in the two data sets. Similarly, the Threefold Rules are applied to a data set and to its predecessor and successor data sets to combine the geometric data contained in the three data sets.

The application of the combination rules results in a quantity of geometric data of a selected NC data set being translated into another quantity of geometric data by linking the selected NC data set to an adjacent NC data set, or within the NC data set itself. The combination rules thereby modify the geometric data contained in the subject NC data set, producing information on the ending point or center point coordinates, and the like of the associated contour section. Thus, the contour algorithm serves to supplement the geometric data of the selected NC data set. The geometric data obtained in this manner contains a greater amount of information and is therefore referred to as higher-level data.

In addition to combining adjacent data sets using the Twofold Rules and the Threefold Rules, it is also possible to incorporate the geometric data of an arbitrary NC data set into the combination, even if the reference data is only available in the incremental reference system and not available in the Cartesian coordinate system. This would of course require the use of the data set number of the NC data set which is being referenced when performing the combination.

As mentioned, the contour algorithm performs the combination in accordance with the above three groups of combination rules: Single Rules, Twofold Rules, and Threefold Rules. The combination rules supplement the data sets with geometric data to more completely define the contour and to interlink the contour portions. For example, if the Single Rules are applied to a data set containing information representative of a straight line, the incremental increase of the coordinates relative to the ending point of the predecessor NC data set can be calculated from the angle of inclination and the length, or vice versa. Similarly, in the case of a circle, the tangent angle at the ending point can be calculated from the tangent angle at the starting point of a circle or arc and the incremental center angle. (The tangent angle at the starting point refers to the angle of the tangent that one could lay on the circle or arc at the starting point. The tangent would have a specific pitch angle relative to the selected coordinate system. Thus, at any given point on a circle or arc there is only one tangent corresponding to a specific tangent angle).

In the case of the Twofold Rules, the ending point of the predecessor NC data set and the length of a straight line which follows the circular curve upon which the ending point of the straight line rests can be calculated. Furthermore, by using the Threefold Rules, a straight line can be determined which is tangent to two circles whose center and radii are known, or a circle with a given radius can be determined which is to be replaced tangentially between two straight lines.

The contour algorithm which applies the combination rules to the geometric data is as follows:
(1) The combination process is initialized;
(2) An NC data set is inputted and linked to the end of a data set processing list;
(3) The Single Rules are applied to the geometric data of the most recently inputted data set, now designated the current data set;
(4) The Twofold Rules are then applied to the current data set and its predecessor data set in the list;
(5) The predecessor data set is designated the current data set and the Single Rules applied to it;
(6) The Twofold Rules are then applied to the new current data set and its predecessor data set;
(7) Steps 5 and 6 are repeated until the beginning of the list is reached;
(8) The processing direction of the list is then reversed;
(9) The second data set in the list is designated the current data set and the Threefold Rules applied to the newly designated current data set and its successor and predecessor data sets;
(10) The Twofold Rules are then applied to the current and successor data sets;
(11) The Single Rules are then applied to the current data set;
(12) The successor data set is now made the current data set and the Threefold Rules are applied to it and its two adjacent data sets;
(13) Steps 10, 11 and 12 are repeated until the end of the list is reached;

(14) Steps 3–13 are then repeated until the application of the combination rule produces no new geometric data; and

(15) Steps 2–14 are then repeated until all the NC data sets are complete in their geometric data or new geometric data is not obtained from the application of the combination rules.

An NC data set is completely established when further geometric data can no longer be calculated for that NC data set. For example, in the case of a straight line, the NC data set is complete if the geometric data components A, KL, U, V are determined. In the case of a circle, the NC data set is complete if the geometric data components A, R, MA, MU, MV, U, V are determined.

In some cases, the application of the contour algorithm can lead to ambiguities. Therefore, a "back track" algorithm, commonly known in the art, is stored in the memory SB connected to the computer C. The back track algorithm is a component of the contour algorithm and is constantly applied during the processing of the data sets.

When multiple solutions to a process are possible, the back track algorithm detects and retains each possible solution. The data processing is continued using the first solution until a possible contradiction occurs with some other inputted ot calculated value. The incorrect solution and any intermediate results obtained from it are then cancelled and the data set processing continued with the next solution.

For example, in the case where a straight line intersects a circle to yield two section points, the back track algorithm, in cooperation with the contour algorithm, selects one of the section points and begins processing the data. If an error is detected, the processing is interrupted. The back track algorithm resets the processing operations to the point at which the selection between the two section points was made. The alternative section point is then selected and the data processing continued using that section point.

Figure 2:
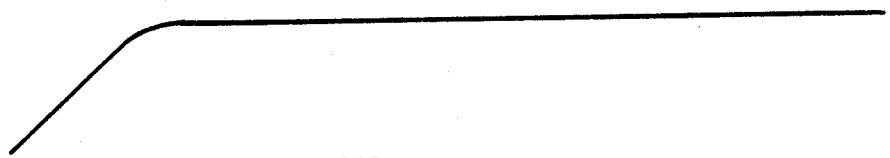
FIG. 2 shows a portion of a contour for illustrating the operation of the embodiment in FIG. 1.

To illustrate the process of the preferred embodiment a geometric contour is presented in FIG. 2. The geometric contour comprises a straight line of A=45°; a circular arc of R=10 and condition T (tangential condition); and a straight line of U=100, V=10 and A=10°. The data components A, R, T, U, V are defined in Appendix A.) For clarity of illustration, the interaction of the known back track algorithm will not be included in the discussion of this example.

Figure 3A:
FIGS. 3a–3bb illustrate the application of the contour algorithm used in the embodiment in FIG. 1.

The contour algorithm, as outlined above, begins with an initialization. A data set, set 0, is assumed to define a fully determined straight line with end point U=0, V=0 and angle A=0°. The data set 0 is assumed to be the last incomplete data set processed and is schematically represented in FIG. 3a. The data set 0 defines the first data set of a list of data sets to be processed.

Figure 3B:
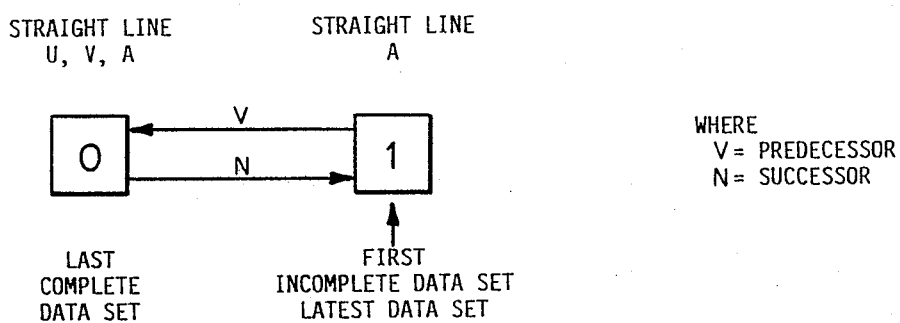

The first data set, set 1, is read into the apparatus of the preferred embodiment and appended to the end of the data set processing list, as represented in FIG. 3b. The newly inputted data set 1 is designated the current data set. The data set designated as the current data set will be indicated in FIGS. 3b–3bb by the upwardly directed pointer.

Figure 3C:
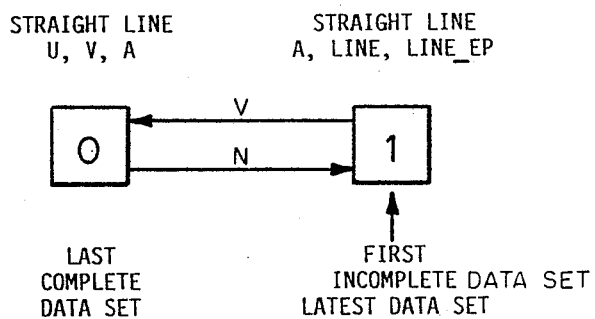

In accordance with the contour algorithm outlined above, the Single Rules are applied to data set 1. None of these rules produce additional geometric data. Next, the Twofold Rules are applied to data set 1 and its predecessor, data set 0. Here, Rule 23 generates for data set 1 the data components LINE and LINE_EP. See FIG. 3c.

Figure 3D:
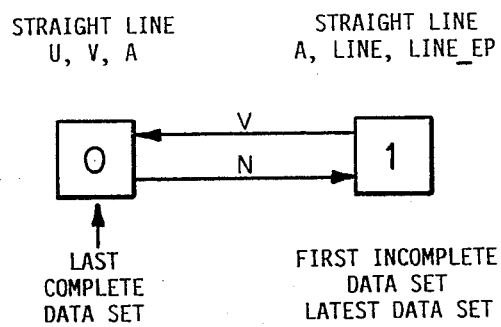
Figure 3E:
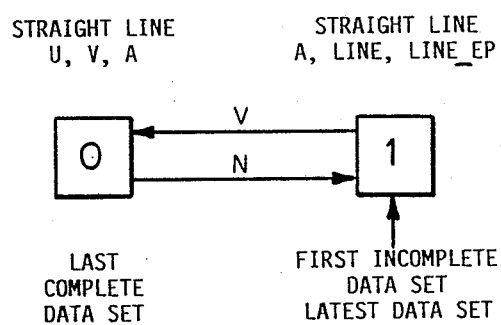

The predecessor data set, set 0, now becomes the current data set. See FIG. 3d. Since the beginning of the list is reached, the direction in which the list is processed is reversed and the pointer moved to the second data set, set 1. See FIG. 3e.

Continuing with the contour algorithm outlined above, the Threefold Rules would next be applied to the current data set, set 1. However, data set 1 does not, at present, have a successor data set. Therefore the Threefold Rules can not be applied. Similarly, the Twofold Rules cannot be applied since in this processing direction the Twofold Rules require a successor data set. See the outline of the contour algorithm above. The Single Rules are then applied to data set 1, and in this case no additional geometric data is produced.

The application of the combination rules to the data sets 0, 1 will not produce additional geometric data components. Therefore, following the algorithm outlined above, the next data set is read in.

Figure 3F:
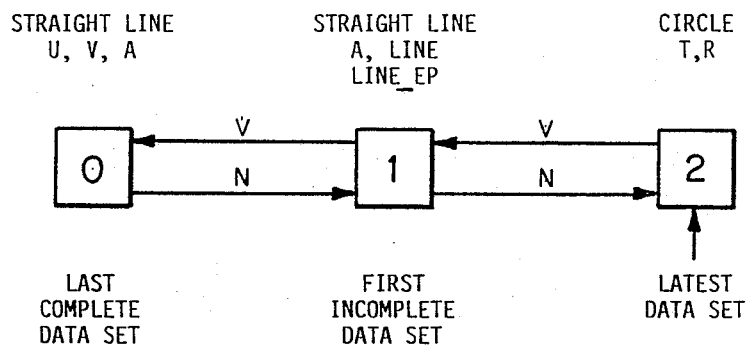
Figure 3G:
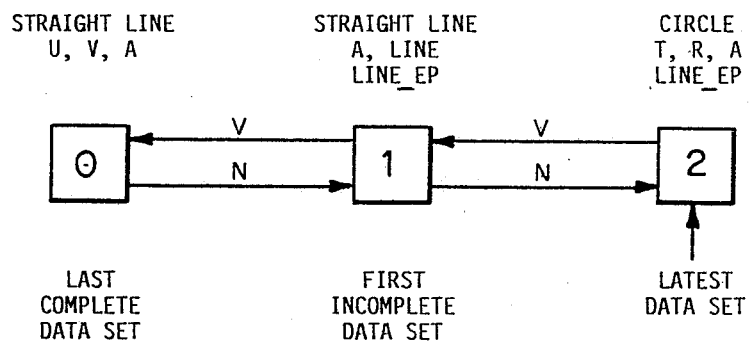
Figure 3H:
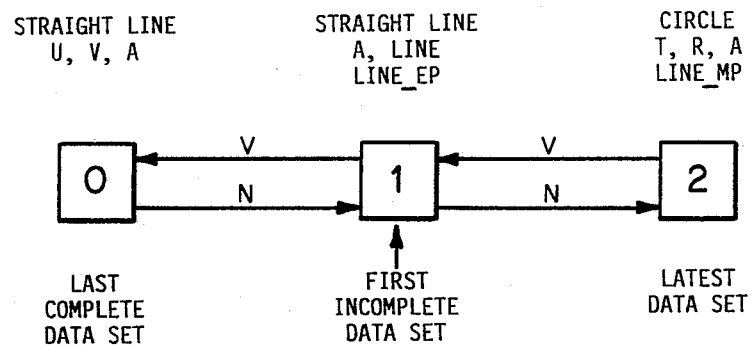

The new data set is identified as data set 2 and designated the current data set. See FIG. 3f. The processing direction is reestablished to be from the end of the list to the beginning of the list. The Single Rules are applied to data set 2. Additional geometric data cannot be generated with these rules. The Twofold Rules are then applied to data set 2 and its predecessor, data set 1. Rules 89 and 1 are found to generate new geometric data and yield the geometric data components LINE_MP and A, respectively. See FIG. 3g. The data set 1 is now designated to be the current data set, as shown in FIG. 3h.

Figure 3I:
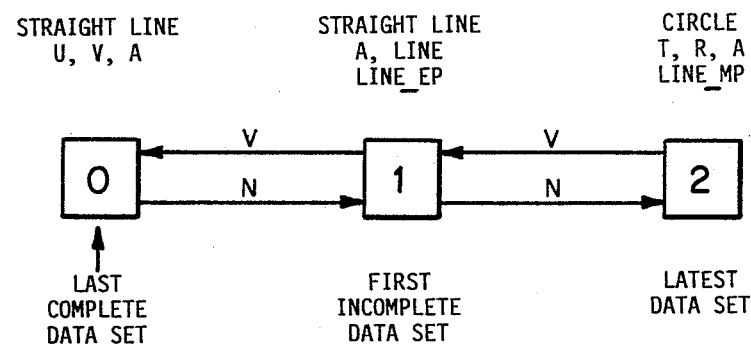

The Single Rules are applied to data set 1. Additional geometric data cannot be produced. Similarly, the Twofold Rules are applied to data set 1 and its predecessor, data set 0. Additional geometric data can also not be produced with these rules. The data set 0 then becomes the current data set as shown in FIG. 3i.

Figure 3J:
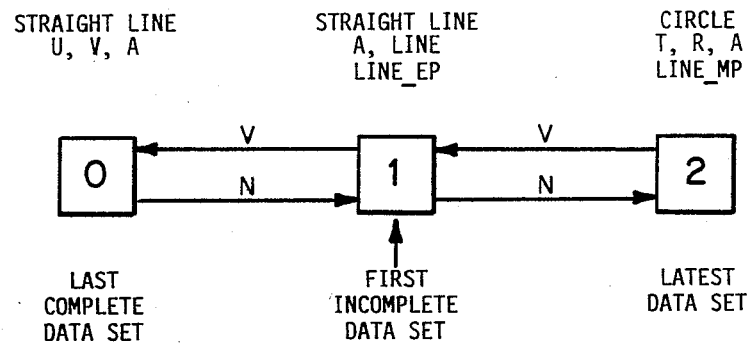

Since the current data set is at the beginning of the list, the processing direction is reversed and data set 1 is designated the current data set. See FIG. 3j.

Figure 3K:
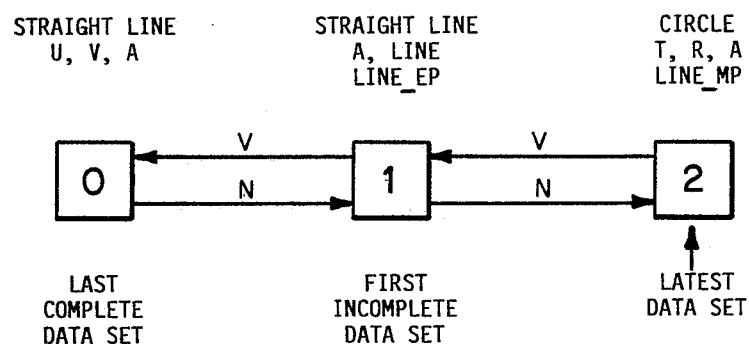

The Threefold Rules are applied to the data set 1 and its adjacent data sets 0, 2. No Threefold Rule is found to produce additional geometric data. The Twofold Rules are then applied to the data set 1 and its successor, data set 2. No Twofold Rule is found to produce additional geometric data. Next, the Single Rules are applied to the data set 1 and again additional geometric data is not produced. The data set 2 now becomes the current data set, as shown in FIG. 3k.

The Threefold Rules and the Twofold Rules can not be applied to data set 2 since data set 2 does not, at present, have a successor data set. The Single Rules are then applied to data set 2. None of the Single Rules produce additional geometric data.

Figure 3L:
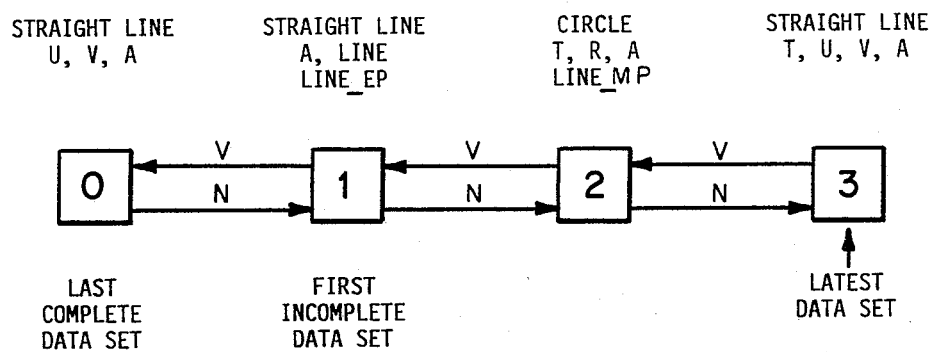
Figure 3M:
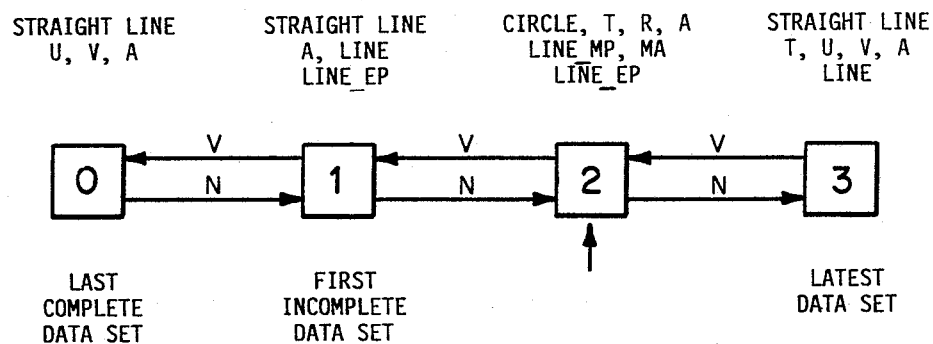

Since additional geometric data can not be produced by the combination rules, the next data set, set 3, is read into the apparatus of the preferred embodiment, see FIG. 3l. The Single Rules are applied to data set 3. Additional geometric data is not produced. The Twofold Rules are then applied to data set 3 and its predecessor, data set 2. Additional geometric data is produced by the application of these rules. Rule 75 generates for data set 2 the component MA; Rule 19 generates the component LINE_EP for data set 2; and Rule 19 generates for data set 3 the component LINE. The data set 2 now becomes the current data set, as shown in FIG. 3m.

Figure 3N:
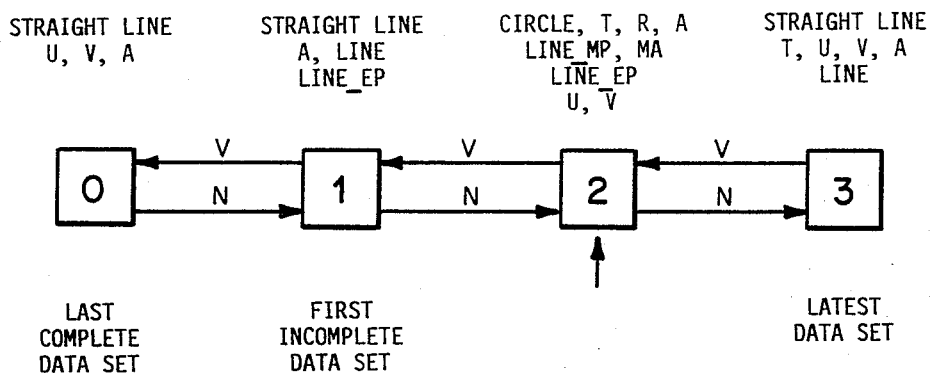
Figure 3O:
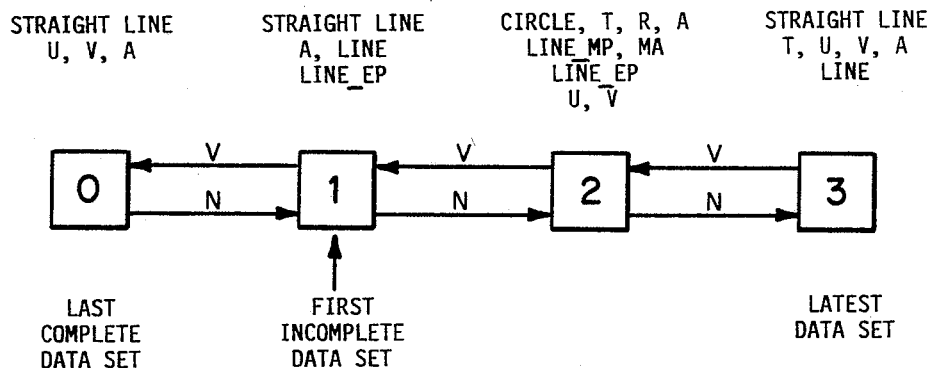

The Single Rules are applied to data set 2. Additional geometric data is not generated. The Two-fold Rules are then applied to data set 2 and its predecessor, data set 1. Rule 57 generates the component LINE_EP. The component LINE_EP was already determined for data set 2. The two lines are determined to intersect and yield the additional components U, V. See FIG. 3n. The data set 1 is now designated the current data set, as shown in FIG. 3o.

Figure 3P:
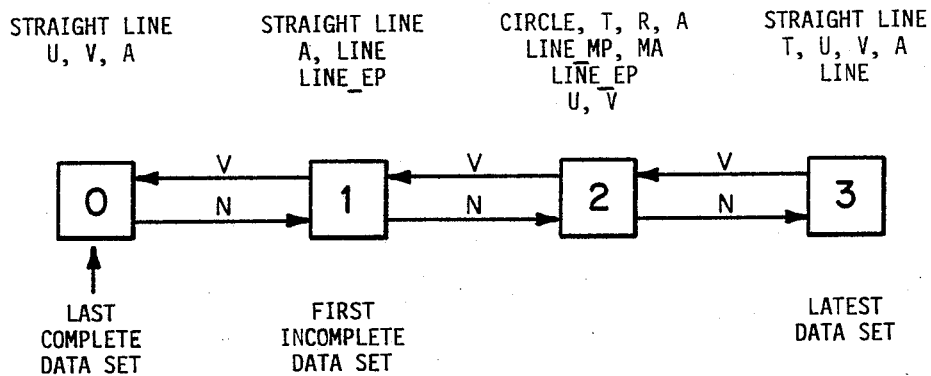
Figure 3Q:
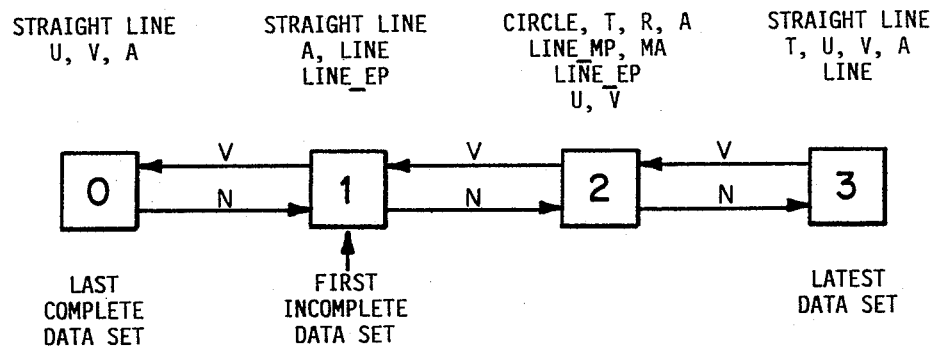

The Single Rules and Twofold Rules are applied to the data set 1 and the data sets 1, 0, respectively. Additional geometric data is not produced. The data set 0 then becomes the current data set. See FIG. 3p. Since data set 0 is at the beginning of the list, data set 1 is designated the current data set. See FIG. 3q.

Figure 3R:
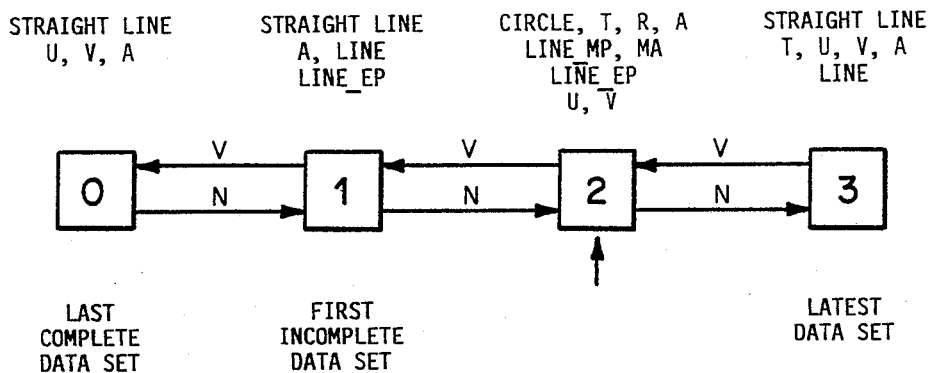

The Threefold Rules are applied to data sets 0, 1, 2. Additional geometric data is not produced. The Twofold Rules are then applied to data sets 1, 2. Additional geometric data is not produced. Similarly, the Single Rules are applied to data set 1. None of the Single Rules produce additional geometric data. The data set 2 is now designated to be the current data set. See FIG. 3r.

Figure 3S:
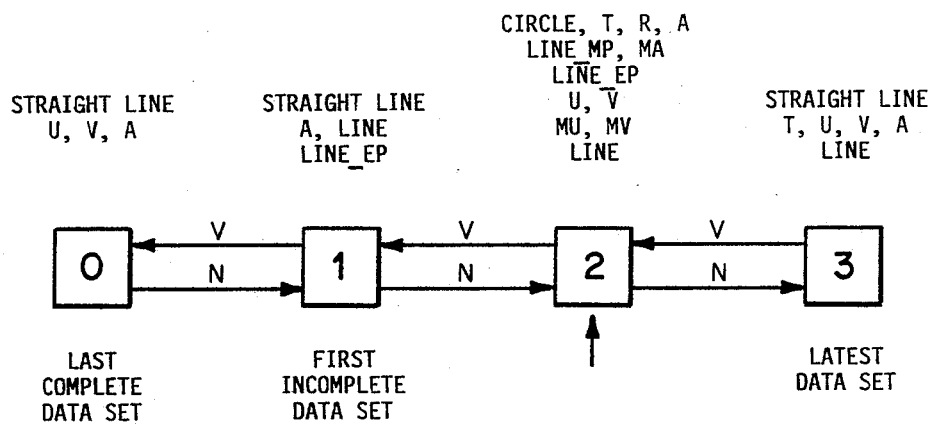
Figure 3T:
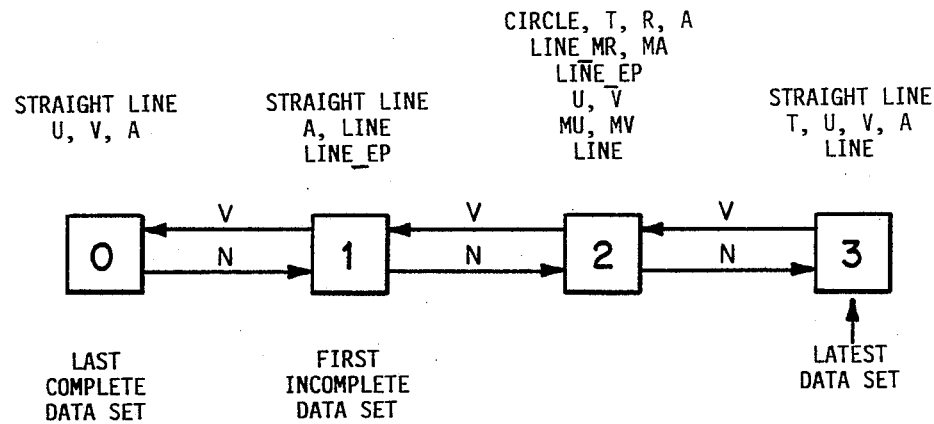

The Threefold Rules are applied to data sets 1, 2, 3. Rule 203 generates for data set 2 the geometric data component LINE_MP. The component LINE_MP was already calculated for data set 2. The two lines are found to intersect and yield the geometric data components MU, MV. The Twofold Rules are then applied to data sets 2, 3. Additional geometric data is not produced. The Single Rules are applied to data set 2. Rule 55 generates for data set 2 the geometric data component LINE. See FIG. 3s. The data set 3 now becomes the current data set, as shown in FIG. 3t.

The Threefold Rules and the Twofold Rules can not be applied to data set 3 since data set 3 has no successor data set. The Single Rules are applied to data set 3. Additional geometric data is not produced.

The application of the contour algorithm does not yet end since additional combination rules are still executable on the data contained in data sets 0–3. The processing direction is therefore reversed and the processing continued.

Figure 3U:
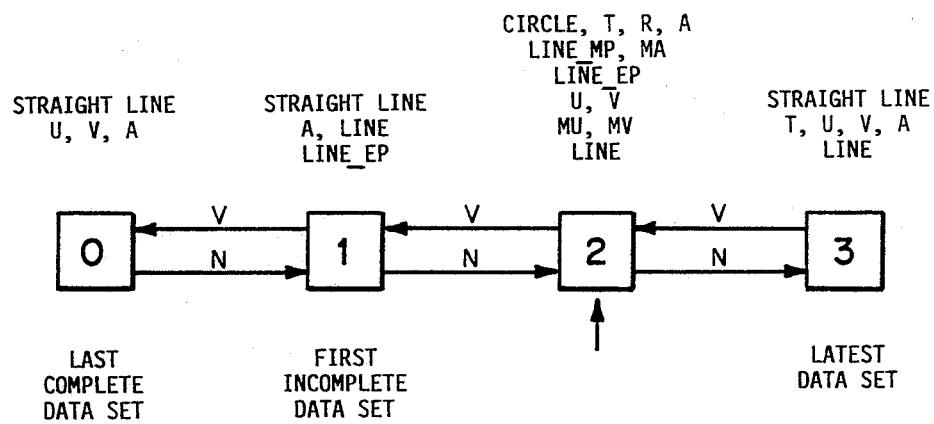

The Single Rules are applied to data set 3. Additional geometric data is not produced. The Twofold Rules are then applied to data sets 3, 2. Again, additional geometric data is not produced. The data set 2 now becomes the current data set. See FIG. 3u.

Figure 3V:
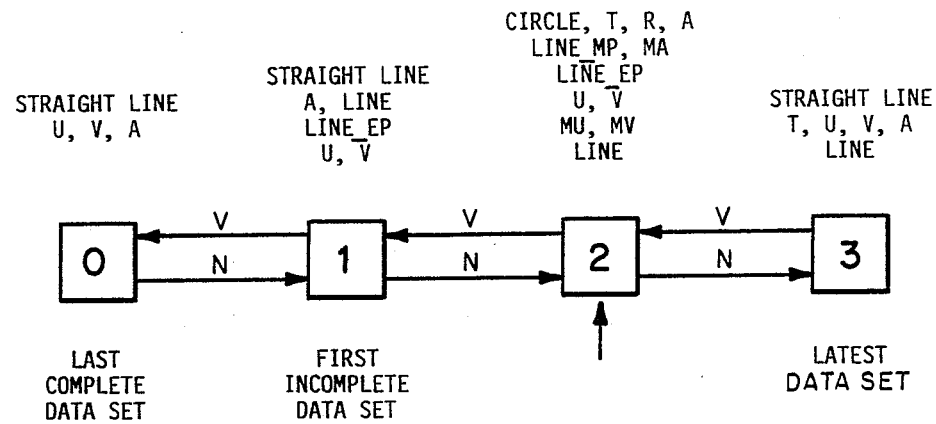
Figure 3W:
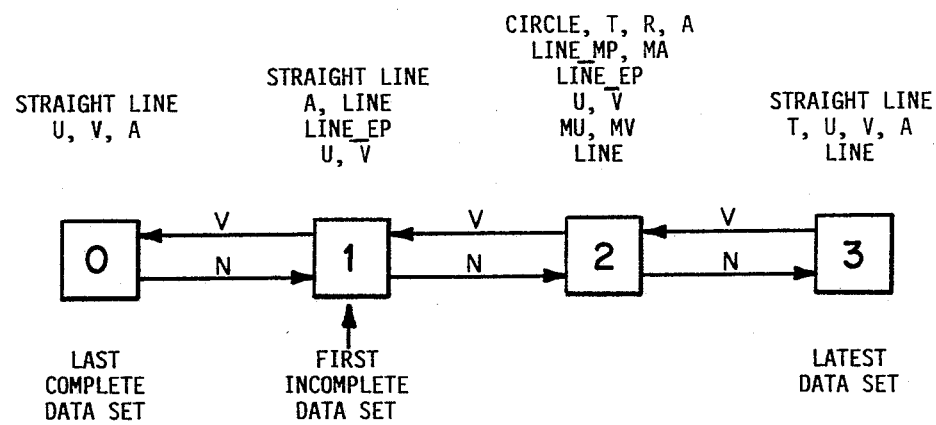

The Single Rules are applied to data set 2. Additional geometric data is not produced by these rules. The Twofold Rules are then applied to data sets 2, 1. Rule 100 generates for data set 1 the geometric data component LINE_EP. The intersection of this line with a LINE_EP, previously determined for data set 1 yields the data components U, V. See FIG. 3v. The data set 1 now becomes the current data set. See FIG. 3w.

Figure 3X:
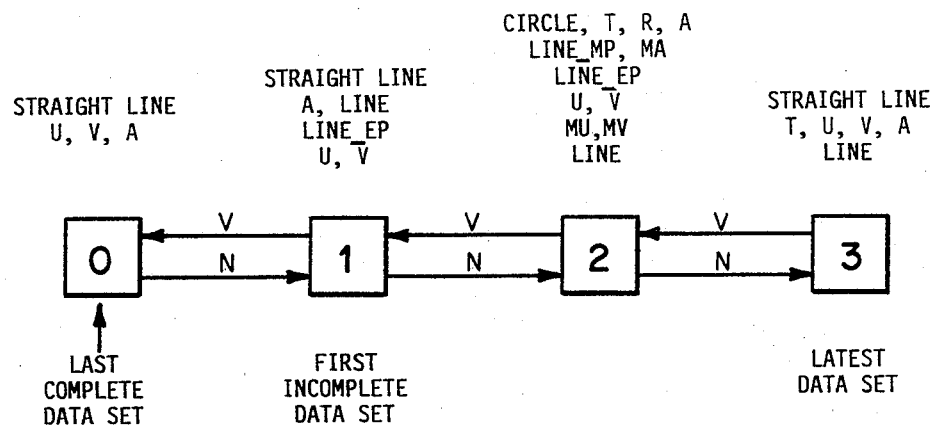
Figure 3Y:
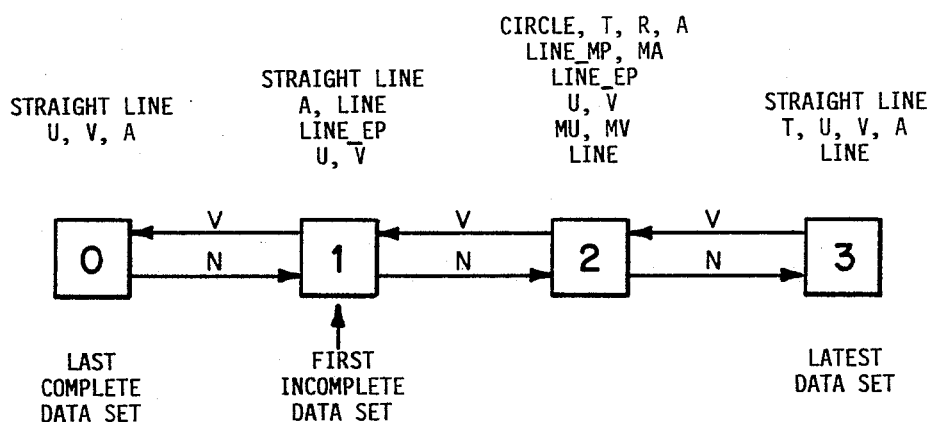

The Single Rules and the Twofold Rules are applied to data set 1 and data sets 1, 0, respectively. Additional geometric data is not produced. The data set 0 becomes the current data. See FIG. 3x. However, since data set 0 is at the beginning of the list, the data set 1 becomes the current data set. See FIG. 3y.

Figure 3Z:
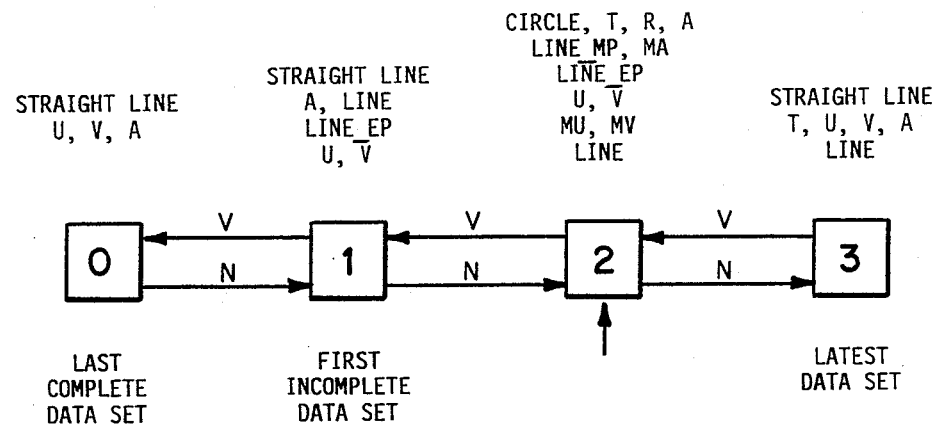
Figure 3A:
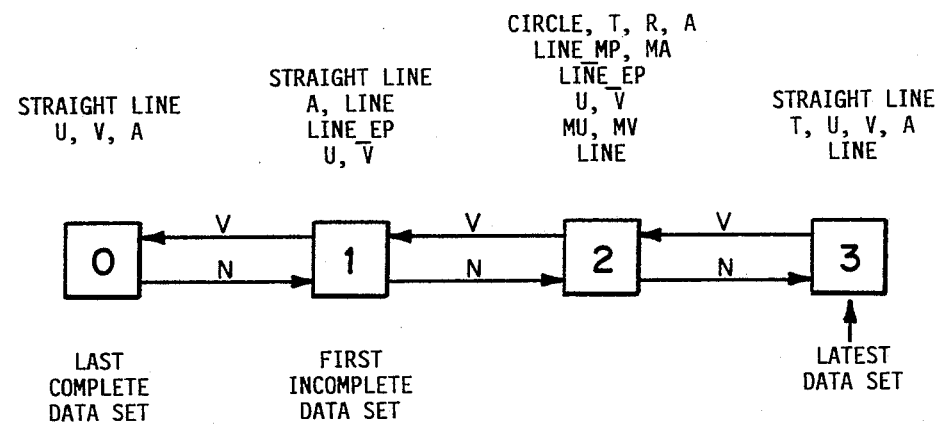
Figure 3B:

The Threefold Rules are applied to data sets 0, 1, 2. Additional geometric data is not produced. Similarly, the Twofold Rules and the Single Rules are found to not produce additional geometric data. The data set 2 now becomes the current data set. See FIG. 3z.

The Threefold Rules, the Twofold Rules and the Single Rules are applied to data sets 1, 2, 3, data sets 2, 3 and data set 2. None of these combination rules produce additional geometric data. The data set 3 now becomes the current data set. See FIG. 3aa.

The Threefold Rules and the Twofold Rules can not be applied to the data set 3 since the data set 3 has no successor data set. The Single Rules are then applied to data set 3. None of the Single Rules produce additional geometric data.

At this point, all of the data sets 0–3 are complete. The complete sets can now be taken out of the processing portion of the preferred embodiment and used for other purposes. The complete data sets may be transferred to the result memory SR. The complete data sets may then be used to program a numerical machine tool to produce the workpiece or used by the graphic unit G to graphically display the workpiece contour on the display CRT. Of course, if additional data sets are available for reading, the contour algorithm may be continued using the last complete data set, set 3, as the first data set in the processing list. See FIG. 3bb.

With the device described, it is possible in an especially simple manner to determine complete workpiece contours. It should be understood that it is not necessary to display these contours on a display screen of a numerically controlled machine. Rather, the contours can be created directly through workpiece processing if the device of the present invention directly feeds a numerically controlled machine. It should also be understood that the device of the present invention is advantageously usable in programmable environments other than in numerically controlled machines.

Of course, it should also be understood that a wide range of changes and modifications can be made to the preferred embodiment described above. For example, the order in which the combination rules are applied to the data sets may be modified. Also, additional combination rules may be added or some combination rules eliminated. Similarly, geometric components other than those disclosed may be used or the ones given eliminated. It is therefore intended that the foregoing detailed description be regarded as illustrative rather than limiting, and that it be understood that it is the following claims, including all equivalents, which are intended to define the scope of this invention.

Appendix A

| Data Components Representative Of A Straight Line | |
|---|---|
| U, V - | Cartesian coordinates of the ending point; |
| IU, IV - | incremental definition of the Cartesian coordinates with reference to the ending point of another contour section; |
| A - | pitch angle of the straight line; |
| IA - | incremental definition of the pitch angle with reference to the pitch angle in the ending point of another contour section; |
| KL - | distance between the starting point and ending point of the straight line; |
| DP - | distance between an arbitrary point and the straight line; |
| P1L, P2L - | arbitrary points on the straight line, excluding the starting point or ending point; |
| PR - | polar radius of the ending point with respect to a predefined pole; |
| PA - | polar angle of the ending point with respect to a predefined pole; |
| P - | parallel to another straight line; |
| DG - | distance from a parallel straight |

Appendix A-continued

| | |
|---|---|
| IPR - | incremental polar radius of the ending point with respect to a predefined pole and the ending point of another contour section; |
| IPA - | incremental polar angle of the ending point with respect to a predefined pole and the ending point of another contour section; |
| T - | tangential condition (corresponds to IA = 180°); |
| GA, GE - | beginning and ending, respectively, of a closed contour. |

Data Components Representative Of A Circle

| | |
|---|---|
| U, V - | Cartesian coordinates of the circular arc ending point; |
| IU, IV - | incremental definition of the Cartesian coordinates with respect to the ending point of another contour section; |
| A - | pitch angle of the circular arc at the starting point equal to the tangent angle of the circle in the starting point; |
| IA - | incremental definition of the pitch angle; |
| KL - | distance between the starting point and the ending point of the arc. |
| DP - | distance between an arbitrary point and the circle; |
| P1L, P2L, P3L - | arbitrary points on the circle, excluding the starting point or ending point; |
| MU, MV - | Cartesian coordinates of the center of the circle; |
| MA - | polar angle of the ending point with respect to the center as a pole; |
| IMA - | center angle of the circular arc; |
| PR - | polar radius of the ending point with respect to a predefined pole; |
| PA - | polar angle of the ending point with respect to a predefined pole; |
| MPR - | polar radius of the center with respect to a predefined pole; |
| MPA - | polar angle of the center with respect to a predefined pole; |
| DR - | turning direction of the circular arc; |
| IMU, IMV - | incremental definition of the Cartesian coordinates of the ending point with respect to the ending point of another contour section; |
| IPR - | incremental polar radius of the ending point with respect to a known pole and the ending point of another contour section; |
| IPA - | incremental polar angle of the ending point with respect to a known pole and the ending point of another contour section; |
| IMPR - | incremental polar radius of the center with respect to a known pole and the ending point of another contour section; |
| IMPA - | incremental polar angle of the center with respect to a known pole and the ending point of another contour section; |
| R - | radius of the circle; |
| T - | tangential condition; |
| GA, GE - | beginning and ending, respectively, of a closed contour. |

Additional Data Components

| | |
|---|---|
| LINE | straight line through a given point and angle, may be defined by a mathematical linear equation; |
| LINE_MP - | same as LINE, wherein the midpoint of the circuit lies on the calculated line; |
| LINE_EP - | proceeding from an arbitrary point the end point of a straight line lies on a circle whose radius corresponds to the length of the straight line; |
| W - | angle A runs horizontally (simplified representation of a special case); |
| S - | angle runs vertically (simplified representation of a special case); |
| MA_W - | horizontal polar angle of the ending point with respect to the center as a pole; |
| MA_S - | vertical polar angle of the ending point with respect to the center as a pole. |

Appendix B

Single Rules

| Current Data Set | | Higher-Level Data |
|---|---|---|
| 24: <STRAIGHT LINE,P1L,DP> | → | <A> |
| 26: <STRAIGHT LINE,A,DP> | → | <LINE> |
| 25: <STRAIGHT LINE,U,V,DP> | → | <A> |
| 13: <STRAIGHT LINE,P1L,P2L> | → | <A> |
| 14: <STRAIGHT LINE,P1L,U,V> | → | <A> |
| 6: <STRAIGHT LINE,IU,IV> | → | <A,KL> |
| 7: <STRAIGHT LINE,IU=0> | → | <A> |
| 8: <STRAIGHT LINE,IV=0> | → | <A> |
| 2: <STRAIGHT LINE,KL,IU> | → | <A> |
| 3: <STRAIGHT LINE,KL,IV> | → | <A> |
| 4: <STRAIGHT LINE,A,IU> | → | <KL> |
| 5: <STRAIGHT LINE,A,IV> | → | <KL> |
| 15: <CIRCLE,IMU,IMV> | → | <A,R> |
| 16: <CIRCLE,IMU=0> | → | <A> |
| 36: <CIRCLE,IMV=0> | → | <A> |
| 61: <CIRCLE,R,IMU> | → | <A> |
| 62: <CIRCLE,R,IMV> | → | <A> |
| 63: <CIRCLE,A,IMU> | → | <R> |
| 64: <CIRCLE,A,IMV> | → | <R> |
| 27: <U,LINE_EP> | → | <V> |
| 28: <V,LINE_EP> | → | <U> |
| 78: <CIRCLE,A,IMA> | → | <MA> |
| 69: <CIRCLE,MA,IMA> | → | <A> |
| 50: <CIRCLE,U,V,R> | → | <LINE_MP> |
| 44: <CIRCLE,P1L,P2L> | → | <LINE_MP> |
| 43: <CIRCLE,P1L,P3L> | → | <LINE_MP> |
| 49: <CIRCLE,P1L,R> | → | <LINE_MP> |
| 46: <CIRCLE,U,V,P1L> | → | <LINE_MP> |
| 52: <CIRCLE,U,V,MA> | → | <LINE_MP> |
| 40: <CIRCLE,DP,R> | → | <LINE_MP> |
| 41: <CIRCLE,LINE MP,MU> | → | <MV> |
| 42: <CIRCLE,LINE MP,MV> | → | <MU> |
| 53: <CIRCLE,MU,MV,MA> | → | <LINE_EP> |
| 71: <CIRCLE,MA,KL,R> | → | <A> |
| 79: <CIRCLE,A,KL,R> | → | <MA> |
| 81: <CIRCLE,DP,MU,MV> | → | <R> |
| 82: <CIRCLE,KL,IMA> | → | <R> |
| 96: <CIRCLE,MU,MV,U,V> | → | <MA> |
| 86: <CIRCLE,U,MA W> | → | <MU> |
| 87: <CIRCLE,V,MA S> | → | <MV> |
| 72: <CIRCLE,MU,MA W> | → | <U> |
| 73: <CIRCLE,MV,MA S> | → | <V> |
| 116: <CIRCLE,U,V,MU,MV> | → | <R,LINE> |
| 48: <CIRCLE,P1L,MU,MV> | → | <R> |
| 55: <CIRCLE,MU,MV,R> | → | <LINE> |
| 18: <STRAIGHT LINE,P1L,A> | → | <LINE> |
| 70: <LINE> | → | <LINE_EP> |

Appendix C

TWOFOLD RULES

| | Predecessor Data Set Current Data Set | or | Current Data Set Successor Data Set | | Higher-Level Data For Predecessor or Current Data Set | Higher-Level Data For Current or Successor Data Set |
|---|---|---|---|---|---|---|
| 31: | <U,V> | | <STRAIGHT LINE,DP> | → | <> | <A> |
| 21: | <U,V> | | <STRAIGHT LINE,P1L> | → | <> | <A> |
| 89: | <STRAIGHT LINE,LINE> | | <CIRCLE,R> | → | <> | <LINE_MP> |
| 90: | <CIRCLE,R> | | <STRAIGHT LINE,LINE> | → | <LINE_MP> | <> |
| 17: | <STRAIGHT LINE> | | <A,IA> | → | <A> | <> |
| 1: | <STRAIGHT LINE,A> | | <IA> | → | <> | <A> |
| 74: | <CIRCLE,MA> | | <IA> | → | <> | <A> |
| 75: | <CIRCLE> | | <A,IA> | → | <MA> | <> |
| 11: | <U> | | <IU> | → | <> | <U> |
| 12: | <V> | | <IV> | → | <> | <V> |
| 9: | <> | | <U,IU> | → | <U> | <> |
| 10: | <> | | <V,IV> | → | <V> | <> |
| 76: | POL | <U,V> | <IPA> | → | <> | >LINE_EP> |
| 77: | POL | <> | <U,V,IPA> | → | <LINE_EP> | <> |
| 83: | POL | <U,V> | <IPR> | → | <> | <LINE_EP> |
| 91: | POL | <> | <U,V,IPR> | → | <LINE_EP> | <> |
| 118: | POL | <U,V> | <IMPA> | → | <> | <LINE_MP> |
| 119: | POL | <> | <MU,MV,IMPA> | → | <LINE_EP> | <> |
| 120: | POL | <U,V> | <IMPR> | → | <> | <LINE_MP> |
| 121: | POL | <> | <MU,MV,IMPR> | → | <LINE_EP> | <> |
| 102: | <U> | | <IMU> | → | <> | <MU> |
| 103: | <V> | | <IMV> | → | <> | <MV> |
| 104: | <> | | <MU,IMU> | → | <U> | <> |
| 108: | <> | | <MV,IMV> | → | <V> | <> |
| 37: | <U> | | <STRAIGHT LINE,A,KL> | → | <> | <U> |
| 38: | <V> | | <STRAIGHT LINE,A,KL> | → | <> | <V> |
| 39: | <> | | <STRAIGHT LINE,U,A,KL> | → | <U> | <> |
| 88: | <> | | <STRAIGHT LINE,V,A,KL> | → | <V> | <> |
| 109: | <U> | | <CIRCLE,A,R> | → | <> | <MU> |
| 110: | <V> | | <CIRCLE,A,R> | → | <> | <MV> |
| 111: | <> | | <CIRCLE,MU,A,R> | → | <U> | <> |
| 112: | <> | | <CIRCLE,MV,A,R> | → | <V> | <> |
| 32: | <U> | | <STRAIGHT LINE,A,S> | → | <> | <U> |
| 33: | <V> | | <STRAIGHT LINE,A,W> | → | <> | <V> |
| 34: | <> | | <STRAIGHT LINE,U,A,S> | → | <U> | <> |
| 35: | <> | | <STRAIGHT LINE,V,A,W> | → | <V> | <> |
| 114: | <> | | <CIRCLE,MU,A,W> | → | <U> | <> |
| 115: | <> | | <CIRCLE,MV,A,S> | → | <V> | <> |
| 19: | <> | | <STRAIGHT LINE,U,V,A> | → | <LINE_EP> | <LINE> |
| 23: | <U,V> | | <STRAIGHT LINE,A> | → | <> | <LINE,LINE_EP> |
| 22: | <U,V> | | <KL> | → | <> | <LINE_EP> |
| 20: | <> | | <U,V,KL> | → | <LINE_EP> | <> |
| 30: | <LINE_EP> | | <STRAIGHT LINE,A,KL> | → | <> | <LINE_EP> |
| 29: | <> | | <STRAIGHT LINE,A,KL,LINE_EP> | → | <LINE_EP> | <> |
| 54: | <U,V> | | <CIRCLE,A> | → | <> | <LINE_MP> |
| 45: | <U,V> | | <CIRCLE,PIL> | → | <> | <LINE_MP> |
| 47: | <U,V> | | <CIRCLE,U,V> | → | <> | <LINE_MP> |
| 51: | <U,V> | | <CIRCLE,R> | → | <> | <LINE_MP> |
| 56: | <> | | <CIRCLE,MU,MV,A> | → | <LINE_EP> | <> |
| 57: | <LINE_EP> | | <CIRCLE,R,MA,A> | → | <> | <LINE_EP> |
| 58: | <LINE_EP> | | <CIRCLE,IU,IV> | → | <> | <LINE_EP> |
| 59: | <> | | <CIRCLE,IU,IV,LINE_EP> | → | <LINE_EP> | <> |
| 60: | <> | | <CIRCLE,R,MA,A,LINE_EP> | → | <LINE_EP> | <> |
| 65: | <U> | | <CIRCLE,R,MA,A> | → | <> | <U> |
| 66: | <V> | | <CIRCLE,R,MA,A> | → | <> | <V> |
| 67: | <> | | <CIRCLE,U,R,MA,A> | → | <U> | <> |
| 68: | <> | | <CIRCLE,V,R,MA,A> | → | <V> | <> |
| 84: | <U> | | <CIRCLE,A,W> | → | <> | <MU> |
| 85: | <V> | | <CIRCLE,A,S> | → | <> | <MV> |
| 94: | <U,V> | | <STRAIGHT LINE,U,V> | → | <> | <A> |
| 95: | <U,V> | | <CIRCLE,MU,MV> | → | <> | <A> |
| 100: | <> | | <LINE> | → | <LINE_EP> | <> |

Appendix C-continued
TWOFOLD RULES

| | Predecessor Data Set Current Data Set | or | Current Data Set Successor Data Set | | Higher-Level Data For Predecessor or Current Data Set | Higher-Level Data For Current or Successor Data Set |
|---|---|---|---|---|---|---|
| 80: | <CIRCLE,LINE> | | <CIRCLE,R,T> | → | <> | <LINE_MP> |
| 97: | <CIRCLE,R> | | <CIRCLE,LINE,T> | → | <LINE_MP> | <> |
| 98: | <CIRCLE,LINE> | | <CIRCLE,MU,MV,T> | → | <> | <R> |
| 99: | <CIRCLE,MU,MV> | | <CIRCLE,LINE,T> | → | <R> | <> |
| 117: | <U,V> | | <CIRCLE,MU,MV> | → | <> | <R> |
| 101: | <STRAIGHT LINE, P1L> | | <CIRCLE,LINE,T°> | → | <A> | <> |
| 105: | <CIRCLE,LINE> | | STRAIGHT LINE, P1L,T> | → | <> | <A> |
| 106: | <CIRCLE,LINE> | | <STRAIGHT LINE, U,V,T> | → | <> | <A> |
| 92: | <STRAIGHT LINE> | | <STRAIGHT LINE, PARAL,A> | → | <A> | <> |
| 93: | <STRAIGHT LINE> | | <STRAIGHT LINE, DG,LINE> | → | <LINE> | <> |
| 107: | <STRAIGHT LINE,A> | | <STRAIGHT LINE, PARAL> | → | <> | <A> |
| 113: | <STRAIGHT LINE, LINE> | | <STRAIGHT LINE,DG> | → | <> | <LINE> |

Where
POL indicates a polar coordinate system

Appendix D
THREEFOLD RULES

| | Predecessor Data Set | Current Data Set | Successor Data Set | From These Are Obtained Higher-Level Data Set For |
|---|---|---|---|---|
| 207: | <STRAIGHT LINE> | <CIRCLE,T,KL> | <STRAIGHT LINE, PARAL,T> | |
| | <> (Predecessor) | <R> (Current Data Set) | <> (Successor) | |
| 208: | <STRAIGHT LINE, PARAL> | <CIRCLE,T,KL> | <STRAIGHT LINE,T> | → |
| | <> | <R> | <> | |
| 205: | <STRAIGHT LINE> | <CIRCLE,T> | <STRAIGHT LINE, DG,T> | → |
| | <> | <R> | <> | |
| 206: | <STRAIGHT LINE,DG> | <CIRCLE,T> | <STRAIGHT LINE,T> | → |
| | <> | <R> | <> | |
| 201: | <CIRCLE,LINE> | <STRAIGHT LINE,T> | <CIRCLE,LINE,T> | → |
| | <U,V> | <A,U,V> | <> | |
| 202: | <CIRCLE,LINE> | <CIRCLE,IMA,T> | <CIRCLE,LINE,T> | → |
| | <> | <R,MU,MV> | <> | |
| 203: | <STRAIGHT LINE, LINE> | <CIRCLE,T> | <STRAIGHT LINE, LINE,T> | → |
| | <> | <LINE_MP> | <> | |
| 204: | <U,V> | <STRAIGHT LINE> | <CIRCLE,LINE,T> | → |
| | <> | <A> | <> | |

We claim:

1. A device for determining the contours of a workpiece, the device comprising:
   means for storing geometric data in the form of addressable, incomplete data sets, each incomplete data set representing a corresponding portion of the workpiece contour, each incomplete data set incompletely describing the corresponding portion of the workpiece contour, an each incomplete data set logically and geometrically related to the other incomplete data sets;
   means for combining the geometric data of the data sets to produce geometric data more completely determinative of the workpiece contour.

2. The invention of claim 1 wherein the invention further comprises a result memory for storing the results produced by the means for combining the geometric data.

3. The invention of claim 1 wherein the invention further comprises a graphic unit to graphically display the results produced by the means for combining the geometric data.

4. The invention of claim 3 wherein the graphic unit comprises a memory and a graphic processor for controlling the graphic display.

5. The invention of claim 3 wherein the invention further comprises an input unit; and wherein the graphic unit is capable of being influenced by the input unit.

6. The invention of claim 1 wherein the invention further comprises means for executing a back track algorithm in cooperation with the means for combining the geometric data.

7. The invention of claim 1 wherein the invention further comprises a memory into which the results produced by the means for combining the geometric data are stored, and means for communicating the results to a numerically controlled machine.

8. A device for determining the contours of a workpiece, the device comprising:
means for inputting geometric data in the form of addressable data sets, each data set representing a corresponding portion of the workpiece contour, each data set incompletely describing the corresponding portion of the workpiece contour, and each data set logically and geometrically related to the other data sets;
means for defining a processing list wherein each data set is appended to the end of the processing list in the order in which the data set is inputted;
means for combining the geometric data contained within the data sets of the processing list as each data set is inputted, the means for combining producing supplemental geometric data from the combination of data sets which more completely define the workpiece contour than the geometric data contained in the originally inputted incomplete data sets.

9. A method of determining the contour of a workpiece from a plurality of data sets wherein each data set represents a portion of the workpiece contour and is logically and geometrically related to the other data sets, the method comprising the steps:
defining a set of Single Rules for combining the geometric data contained within a data set to produce supplemental geometric data;
defining a set of Twofold Rules for combining the geometric data contained within a data set and one other data set to produce supplemental geometric data;
defining a set of Threefold Rules for combining the geometric data contained within a data set and two other data sets to produce supplemental geometric data;
defining a processing list for data sets, the first data set of the list comprising a last complete data set;
(a) inputting a data set;
(b) linking the inputted data set to the end of the processing list;
(c) designating the most recently inputted data set as the current data set;
(d) applying the Single Rules to the current data set;
(e) applying the Twofold Rules to the current data set and the predecessor of the current data set;
(f) designating the predecessor of the current data set as the new current data set;
(g) repeating steps (d)–(f) until the first data set is designated the current data set;
(h) designating the successor data set to the current data set as the new current data set;
(i) applying the Threefold Rules to the current data set, the predecessor data set of the current data set, and the successor data set of the current data set;
(j) applying the Twofold Rules to the current data set and the successor data set of the current data set;
(k) applying the Single Rules to the current data set;
(l) designating the successor data set to the current data set as the new current data set;
(m) repeating steps (i)–(l) until the most recently inputted data set is designated the current data set;
(n) repeating steps (d)–(m) until the application of the Single Rules, Twofold Rules, and Threefold Rules fails to produce supplemental geometric information or until the workpiece contour has been completely determined;
(o) repeating steps (a)–(n) until all data sets have been inputted.

10. A device for determining the contour of a workpiece from a plurality of data sets wherein each data set represents a portion of the workpiece contour and is logically and geometrically related to the other data sets, the device comprising:
means for defining a set of Single Rules for combining the geometric data contained within a data set to produce supplemental geometric data;
means for defining a set of Twofold Rules for combining the geometrical data contained within a data set and one other data set to produce supplemental geometric data;
means for defining a set of Threefold Rules for combining the geometric data contained within a data set and two other data sets to produce supplemental geometric data;
means for defining a processing list for data sets, the first data set of the list comprising the last complete data set;
means for inputting a data set;
means for linking the inputted data set to the end of the processing list;
means for designating the most recently inputted data set as the current data set;
means for applying the Single rules to the current data set;
means for applying the Twofold Rules to the current data set and the predecessor of the current data set;
means for designating the predecessor of the current data set as the new current data set;
means for designating the successor data set to the current data set as the new current data set;
means for applying the Threefold Rules to the current data set, the predecessor data set of the current data set, and the successor data set of the current data set;
means for applying the Twofold Rules to the current data set and the successor data set of the current data set;
means for applying the Single Rules to the current data set.

* * * * *

UNITED STATES PATENT AND TRADEMARK OFFICE
CERTIFICATE OF CORRECTION

PATENT NO. : 4,792,889
DATED : December 20, 1988
INVENTOR(S) : Birger Kragelin et al.

It is certified that error appears in the above-identified patent and that said Letters Patent is hereby corrected as shown below:

In column 1, line 9, please delete "representative" and substitute therefor --representation--.

In column 3, line 35, after "example" please insert --,--.

In column 4, line 36, please delete "replaced" and substitute therefor --placed--.

In column 5, line 26, please delete "ot" and substitute therefor --or--.

In column 5, line 45, please delete "10°" and substitute therefor --0°--.

In column 5, line 46, before "The" please insert --(--.

In column 6, line 53, please delete "can not" and substitute therefor --cannot--.

In column 6, line 58, please delete "can not" and substitute therefor --cannot--.

In column 7, line 4, please delete "Two-fold" and substitute therefor --Two fold--.

UNITED STATES PATENT AND TRADEMARK OFFICE
CERTIFICATE OF CORRECTION

PATENT NO. : 4,792,889

DATED : December 20, 1988

INVENTOR(S) : Birger Kragelin et al.

It is certified that error appears in the above-identified patent and that said Letters Patent is hereby corrected as shown below:

In column 7, line 34, please delete "3α" and substitute therefor --3s--.

In column 7, line 36, please delete "can not" and substitute therefor --cannot--.

In column 8, line 6, please delete "can not" and substitute therefor --cannot--.

In column 10, line 58, please delete "<CIRCLE,U,MA W>" and substitute therefor --<CIRCLE,U,MA_W>--.

In column 10, line 59, please delete "<CIRCLE,V,MA S>" and substitute therefor --<CIRCLE,V,MA_S>--.

In column 10, line 60, please delete "<CIRCLE,MU,MA W>" and substitute therefor --<CIRCLE,MU,MA_W>--.

In column 10, line 61, please delete "<CIRCLE,MV,MA S>" and substitute therefor --<CIRCLE,MV,MA_S>--.

In column 11, line 46, please delete "<STRAIGHT LINE,A,W>→" and substitute therefor --<STRAIGHT LINE,A,W>--.

UNITED STATES PATENT AND TRADEMARK OFFICE
CERTIFICATE OF CORRECTION

PATENT NO. : 4,792,889

DATED : December 20, 1988

INVENTOR(S) : Birger Kragelin et al.

It is certified that error appears in the above-identified patent and that said Letters Patent is hereby corrected as shown below:

In column 12, line 21, please delete ">LINE_EP>" and substitute therefor --<LINE_EP>--.

In column 12, lines 45 and 46, please delete

```
"→      <>           <U>
 →      <>    <V>"
``` and substitute therefor

```
--→     <>           <U>
  →     <>           <V>--.
```

In column 13, line 12, please delete "<CIRCLE,LINE,T" and substitute therefor --<CIRCLE,LINE,T>--.

In column 13, line 14, please delete "STRAIGHT LINE," and substitute therefor --<STRAIGHT LINE,--

UNITED STATES PATENT AND TRADEMARK OFFICE
CERTIFICATE OF CORRECTION

PATENT NO. : 4,792,889
DATED : December 20, 1988
INVENTOR(S) : Birger Kragelin et al.

Page 4 of 4

It is certified that error appears in the above-identified patent and that said Letters Patent is hereby corrected as shown below:

<u>IN THE CLAIMS</u>

In column 13, line 61, please delete "an" and substitute therefor --and--.

In column 16, line 29, please delete "geometrical" and substitute therefor --geometric--.

In column 16, line 44, please delete "rules" and substitute therefor --Rules--.

Signed and Sealed this

Twenty-fourth Day of September, 1991

Attest:

HARRY F. MANBECK, JR.

Attesting Officer

Commissioner of Patents and Trademarks